United States Patent
Bardeen et al.

(10) Patent No.: US 12,398,702 B2
(45) Date of Patent: Aug. 26, 2025

(54) METHOD AND SYSTEM USING SMALL MOLECULE ABSORBERS TO CREATE A PHOTOTHERMAL ACTUATOR

(71) Applicant: THE REGENTS OF THE UNIVERSITY OF CALIFORNIA, Oakland, CA (US)

(72) Inventors: Christopher John Bardeen, Riverside, CA (US); Brandon F. Lui, Riverside, CA (US)

(73) Assignee: THE REGENTS OF THE UNIVERSITY OF CALIFORNI, Oakland, CA (US)

( * ) Notice: Subject to any disclaimer, the term of this patent is extended or adjusted under 35 U.S.C. 154(b) by 284 days.

(21) Appl. No.: 18/301,690

(22) Filed: Apr. 17, 2023

(65) Prior Publication Data

US 2023/0332581 A1 Oct. 19, 2023

Related U.S. Application Data

(60) Provisional application No. 63/331,465, filed on Apr. 15, 2022.

(51) Int. Cl.
F03G 7/00 (2006.01)
(52) U.S. Cl.
CPC .................. *F03G 7/016* (2021.08)
(58) Field of Classification Search
CPC .............. F03G 7/016; F03G 7/06113
See application file for complete search history.

(56) References Cited

PUBLICATIONS

B. F. Lui, C. J. Bardeen, "Using Small Molecule Absorbers to Create a Photothermal Wax Motor," Small 2022, 18, 2105356, © 2021 Wiley-VCH GmbH, Published online: Dec. 2, 2021. (Year: 2021).*
Wilhelm, E., et al. "Phase change materials in microactuators: Basics, applications and perspectives," Sensors and Actuators A 271 (2018) 303-347. (Year: 2018).*
Brandon Lui, "From Molecules to Devices: Using Small Molecules to Create Photomechanical Actuators," University of California Riverside, Dec. 2022. (Year: 2022).*
Abi-Samra, et al., "Infrared Controlled Waxes for Liquid Handling and Storage on a CD-microfluidic Platform", Lab on a Chip, vol. 11, 2011, pp. 723-726.
Ahir, et al., "Photomechanical Actuation in Polymer-Nanotube Composites", Nature Materials, vol. 4, No. 6, Jun. 2005, pp. 491-495.
Ball, et al., "Thermodynamics of the Deposition of Complex Waxes and Asphaltenes in Crude Oil", The Open Thermodynamics Journal, vol. 3, 2009, pp. 34-37.
Carlen, et al., "Electrothermally Activated Paraffin Microactuators", Journal of Microelectromechanical Systems, vol. 11, No. 3, Jun. 2002, pp. 165-174.

(Continued)

*Primary Examiner* — David P. Olynick
(74) *Attorney, Agent, or Firm* — Buchanan Ingersoll & Rooney PC

(57) ABSTRACT

A photon-activated substance is disclosed, which includes a phase change material and a photon activated substance. The photon activated substance can be at least one of (2,6,6-Tetramethylpiperidin-1-yl)oxyl (TEMPO), azobenzene (AZOB), 4-Nitro-4-dimethylaminoazobenzene, Lumogen orange 240, and guaiazulene (GAZ).

20 Claims, 16 Drawing Sheets solid liquid

(56) References Cited

PUBLICATIONS

Chen, et al., "Space-Confined Seeded Growth of Cu Nanorods with Strong Surface Plasmon Resonance for Photothermal Actuation", Angewandte Chemie International Edition, vol. 58, No. 27, Jul. 1, 2019, pp. 9275-9281.

Cunha, et al., "Unravelling the Photothermal and Photomechanical Contributions to Actuation of Azobenzene-doped Liquid Crystal Polymers in Air and Water", Journal of Materials Chemistry C, vol. 7, 2019, pp. 13502-13509.

Deng, et al., "Tunable Photothermal Actuators Based on a Pre-programmed Aligned Nanostructure", Journal of the American Chemical Society, vol. 138, No. 1, Jan. 13, 2016, pp. 225-230.

Fujino, et al., "Picosecond Time-Resolved Raman Study of trans-Azobenzene", Journal of Physical Chemistry A, vol. 104, No. 18, 2000, pp. 4203-4210.

Han, et al., "Carbon-Based Photothermal Actuators", Advanced Functional Materials, vol. 28, No. 40, Article No. 1802235, Oct. 4, 2018, pp. 1-23.

He, et al., "Optical Fiber Waveguiding Soft Photoactuators Exhibiting Giant Reversible Shape Change", Advanced Optical Materials, vol. 9, No. 21, Article No. 2101132, Nov. 4, 2021, pp. 1-9.

Hou, et al., "Photothermally Driven Refreshable Microactuators Based on Graphene Oxide Doped Paraffin", ACS Applied Materials & Interfaces, vol. 9, No. 31, 2017, pp. 26476-26482.

Hu, et al., "A Graphene-Based Bimorph Structure for Design of High Performance Photoactuators", Advanced Materials, vol. 27, No. 47, Dec. 16, 2015, pp. 7867-7873.

Ikeda, et al., "Photomechanics of Liquid-Crystalline Elastomers and Other Polymers", Angewandte Chemie International Edition, vol. 46, No. 4, 2007, pp. 506-528.

Jung, et al., "Microfluidic-Integrated Laser-Controlled Microactuators with on-Chip Microscopy Imaging Functionality", ab on a Chip, vol. 14, No. 19, Oct. 7, 2014, pp. 3781-3789.

Kim, et al., "Organic Photomechanical Materials", ChemPhysChem, vol. 15, No. 3, Feb. 24, 2014, pp. 400-414.

Kuenstler, et al., "Blueprinting Photothermal Shape-Morphing of Liquid Crystal Elastomers", Advanced Materials, vol. 32, No. 17, Article No. 2000609, Apr. 28, 2020, pp. 1-9.

Lalevee, et al., "Electronic Distribution and Solvatochromism Investigation of a Model Radical (2,2,6,6-tetramethylpiperidine N-oxyl: Tempo) Through TD-DFT Calculations Including PCM Solvation", Journal of Molecular Structure: Theochem, vol. 767, No. 1-3, Aug. 24, 2006, pp. 143-147.

Lee, et al., "Thermal Analysis for Bulk-micromachined Electrothermal Hydraulic Microactuators Using a Phase Change Material", Sensors and Actuators A: Physical, vol. 135, No. 2, Apr. 15, 2007, pp. 731-739.

Lee, et al., "Tunable Photothermal Actuation Enabled by Photoswitching of Donor-Acceptor Stenhouse Adducts", ACS Applied Materials & Interfaces, vol. 12, No. 48, Dec. 2, 2020, pp. 54075-54082.

Lima, et al., "Electrically, Chemically, and Photonically Powered Torsional and Tensile Actuation of Hybrid Carbon Nanotube Yarn Muscles", Science, vol. 338, No. 6109, Nov. 16, 2012, pp. 928-932 (6 pages).

Liu, et al., "Correlation of Substituent Effects and Energy Levels of the Two Lowest Excited States of the Azulenic Chromophore", Organic Letters, vol. 2, No. 3, 2000, pp. 269-271.

Liu, et al., "Giant-Amplitude, High-Work Density Microactuators with Phase Transition Activated Nanolayer Bimorphs", Nano Letters, vol. 12, No. 12, Dec. 12, 2012, pp. 6302-6308.

Loomis, et al., "Graphene/Elastomer Composite-Based Photo-Thermal Nanopositioners", Scientific Reports, vol. 3, Article No. 1900, 2013, pp. 1-10.

Lu, et al., "Photomechanical Responses of Carbon Nanotube/Polymer Actuators", Nanotechnology, vol. 18, No. 30, Article No. 305502, 2007, 9 pages.

Ma, et al., "Recent Advances for Phase-transition Materials for Actuators", Journal of Applied Physics, vol. 128, No. 10, Article No. 101101, 2020, 21 pages.

Mann, et al., "A Modeling Strategy for Predicting the Properties of Paraffin Wax Actuators", Actuators, vol. 7, No. 81, 2018, pp. 1-14.

Mann, et al., "The Challenge of Upscaling Paraffin Wax Actuators", Materials & Design, vol. 190, Article No. 108580, May 2020, pp. 1-9.

Michl, et al., "Why is Azulene Blue and Anthracene White? A Simple Mo Picture", Tetrahedron, vol. 32, No. 2, 1976, pp. 205-209.

Naumov, et al., "Mechanically Responsive Molecular Crystals", Chemical Reviews, vol. 115, No. 22, 2015, pp. 12440-12490.

Ogden, et al., "Review on Miniaturized Paraffin Phase Change Actuators, Valves, and Pumps", Microfluidics and Nanofluidics, vol. 17, 2014, pp. 53-71.

Park, et al., "Multifunctional Microvalves Control by Optical Illumination on Nanoheaters and Its Application in Centrifugal Microfluidic Devices", Lab on a Chip, vol. 7, No. 5, May 2007, pp. 557-564.

Sarkisov, et al., "Photomechanical Effect in Films of Polyvinylidene Fluoride", Applied Physics Letters vol. 85, No. 14, Oct. 4, 2004, pp. 2747-2749 (4 pages).

Saydam, et al., "Dispersing Different Nanoparticles in Paraffin Wax as Enhanced Phase Change Materials", Journal of Thermal Analysis and Calorimetry, vol. 135, 2019, pp. 1135-1144.

Shen, et al., "Large Negative Thermal Expansion of a Polymer Driven by a Submolecular Conformational Change", Nature Chemistry, vol. 5, Dec. 2013, pp. 1035-1041.

Srinivasan, et al., "Material Selection for Optimal Design of Thermally Actuated Pneumatic and Phase Change Microactuators", Journal of Microelectromechanical Systems, vol. 18, No. 2, Apr. 2009, pp. 239-249.

Stuart, et al., "Excited-State Structure and Dynamics of cis- and trans-Azobenzene from Resonance Raman Intensity Analysis", Journal of Physical Chemistry A, vol. 111, No. 48, Dec. 6, 2007, pp. 12072-12080.

Taggart, et al., "An Examination of the Nucleation Kinetics of n-Alkanes in the Homologous Series C13H28 to C32H66, and Their Relationship to Structural Type, Associated with Crystallization from Stagnant Melts", Langmuir, vol. 12, No. 23, 1996, pp. 5722-5728.

Templin, P R, "Coefficient of Volume Expansion for Petroleum Waxes and Pure n-Paraffins", Industrial & Engineering Chemistry Research, vol. 48, No. 1, Jan. 1, 1956, pp. 154-161.

Wagner, et al., "Subpicosecond Pump-Probe Measurements of the Electronic Relaxation Rates of The S 1 States of Azulene and Related Compounds in Polar and Nonpolar Solvents", The Journal of Chemical Physics, vol. 98, No. 301, Jan. 1, 1993, pp. 301-307 (8 pages).

Wang, et al., "Maximizing the Performance of Photothermal Actuators by Combining Smart Materials With Supplementary Advantages", Science Advances, vol. 3, No. 4, Article No. e1602697, Apr. 21, 2017, 10 pages.

Ware, et al., "Voxelated Liquid Crystal Elastomers", Science, vol. 347, No. 6225, Feb. 27, 2015, pp. 982-984 (4 pages).

White, Timothy J, "Photomechanical Materials, Composites, and Systems: Wireless Transduction of Light into Work", Wiley, 2017, 435 pages.

Wilhelma, et al., "Phase Change Materials in Microactuators: Basics, Applications and Perspectives", Sensors and Actuators A: Physical, vol. 271, Mar. 1, 2018, pp. 303-347.

Xiao, et al., "Flexible Photodriven Actuator Based on Gradient-Paraffin-Wax-Filled Ti3C2Tx MXene Film for Bionic Robots", ACS Nano, vol. 15, No. 8, Aug. 24, 2021, pp. 12826-12835.

Yu, et al., "Nonadiabatic Dynamics Simulation of the Wavelength-Dependent Photochemistry of Azobenzene Excited to the nπ* and ππ* Excited States", Journal of the American Chemical Society, vol. 142, No. 49, Dec. 9, 2020, pp. 20680-20690.

Yuan, et al., "Engineering the Thermal Conductivity of Functional Phase-Change Materials for Heat Energy Conversion, Storage, and Utilization", Advanced Functional Materials, vol. 30, No. 8, Article No. 1904228, Feb. 19, 2020, pp. 1-31.

(56) References Cited

PUBLICATIONS

Zhang, et al., "Photophysical, Electrochemical, and Photoelectrochemical Properties of New Azulene-based Dye Molecules", Journal of Materials Chemistry, vol. 17, 2007, pp. 642-649.

Zimerman, et al., "Pyrene Photochemistry in Solid n-Alkane Matrices: Comparisons with Liquid-Phase Reactions", Journal of Physical Chemistry A, vol. 103, No. 48, 1999, pp. 9794-9804.

* cited by examiner

Guaiazulene

4-Nitro-4-dimethylaminoazobenzene

Lumogen orange 240

METHOD AND SYSTEM USING SMALL MOLECULE ABSORBERS TO CREATE A PHOTOTHERMAL ACTUATOR

RELATED APPLICATIONS

This application claims priority to U.S. Ser. No. 63/331,465 filed on Apr. 15, 2022, the entire contents of which is incorporated by reference in its entirety.

GOVERNMENT CLAUSE

This invention was made with government support under grant number N00014-18-1-2624 awarded by the Office of Naval Research. The government has certain rights in this invention.

TECHNICAL FIELD

The present disclosure generally relates to a method and system using small molecule absorbers to create a photothermal actuator, for example, a photothermal wax motor.

BACKGROUND

Photons provide a low-loss way to transport energy without the need for physical connections like wires. The transformation of photon energy into mechanical work can be accomplished by the use of a photomechanical material that expands or deforms after absorbing the photons. Often, these materials rely on the photochemical isomerization of organic molecules in ordered matrices like crystals or liquid crystal polymers. Alternatively, photothermal heating can be used to generate expansion and mechanical actuation without any chemical change. Photothermal actuation has several advantages, which include: 1) it avoids photochemistry and possible side reactions that lead to fatigue; 2) since only absorption is required, a large variety of absorbers spanning the optical and infrared spectrum can be used; and 3) heat can diffuse throughout the material beyond the optical absorption depth that limits photon penetration. These advantages are balanced by several disadvantages, which include: 1) heating and cooling dynamics tend to occur on much longer timescales than photochemistry, leading to a slower response; 2) the material response may be sensitive to the ambient temperature; and 3) the material requires a continuous supply of photons to maintain temperature and hold its position, even while not performing any work.

There are several mechanisms by which photothermal heating can generate mechanical changes, e.g., expansion. In the simplest case, vibrational excitation associated with higher temperatures causes an increase in lattice spacing, as described by the thermal expansion coefficient. Photothermally induced solid→solid phase transitions have been successfully used in variety of polymer and semiconductor systems. To generate larger volume changes, solid→liquid phase transitions may be used. There exists a large class of phase change materials (PCMs) that exhibit an expansion upon melting. The largest class of these materials consists of long-chain alkanes (waxes) that undergo a large (10%-15%) volume expansion upon melting. This volume expansion has been harnessed to do mechanical work by a variety of wax motor devices. In commercial devices, the melting is induced by electric current passed through a resistive heating element. To realize photothermal motion, one strategy is to infuse wax into structures composed of carbon nanotubes or two-dimensional Mxene sheets. Depending on shape, these composites can give rise to dramatic photothermal motions like bending, but the wax motor utilizes the melting expansion to move a piston in a standard actuator architecture. In this type of device, the wax must be melted in its own reservoir, and photothermal actuation relies on doping the wax with nanoparticles oxide that absorb visible light or heating the neat wax by infrared radiation. But in these cases, no detailed studies of cycling, work output, or photostability have been reported. Stability is a particular concern because many wax-nanoparticle composites have been shown to undergo phase separation after a few heating-cooling cycles. Recrystallization of the alkane component appears to exclude the nanoparticles, causing them to aggregate and eventually separate from the wax.

Nanoparticles that are larger than the wax molecules can be expected to interfere with alkane chain packing. One way to avoid this interference is to use small molecules that can fit in the interstitial regions of the polycrystalline wax. For example, previous works have shown that pyrene can reside between lamellar regions of alkane layers, allowing reasonably high (millimolar) concentrations to be achieved. One major challenge has been to identify highly soluble small molecule absorbers that can absorb light in the range where relatively inexpensive light source, for example, a relatively high power light sources operating, for example, at approximately 400 nm to 1000 nm and then efficiently turn the absorbed photons into heat.

SUMMARY

In accordance with an embodiment, different small molecule absorbers: (2,2,6,6 Tetramethylpiperidin-1-yl)oxyl (TEMPO), azobenzene (AZOB), 4-Nitro-4-dimethylaminoazobenzene, Lumogen orange 240, and guaiazulene (GAZ) have been identified and can act as photothermal agents to induce a solid→liquid melting transition in eicosane, a low molecular weight PCM. In accordance with an embodiment, the properties of the GAZ/eicosane mixture have been characterized, since the GAZ absorption extends past 750 nm, opening up the possibility of using inexpensive near infrared diodes as the photon source. The GAZ/eicosane composite can be incorporated into a commercial wax motor assembly and, for example, a 532 nm laser light can be used to power the piston actuator which can lift up to 400 g. In addition, there is no loss of lifting capability or GAZ degradation after multiple cycles of irradiation. In accordance with an embodiment, the results of the disclosure herein demonstrate that small molecule absorbers provide a way to create photo-responsive PCMs that are stable and can generate useful actuation. In accordance with an embodiment, the disclosure illustrates examples using eicosane as the PCM, however, the method as disclosed herein is also applicable to the large class of PCMs based on alkane waxes, and providing a general approach for the fabrication of light powered wax motors.

A photon-activated substance is disclosed comprising: a phase change material and a photon activated substance. The photon activated substance can be at least one of (2,2,6,6-Tetramethylpiperidin-1-yl)oxyl (TEMPO), azobenzene (AZOB), 4-Nitro-4-dimethylaminoazobenzene, Lumogen orange 240, and guaiazulene (GAZ).

A method is disclosed for preparing a photon-activated substance, the method comprising: melting a phase change material; mixing solid particles from at least one of (2,2,6, 6-Tetramethylpiperidin-1-yl)oxyl (TEMPO), azobenzene (AZOB), 4-Nitro-4-dimethylaminoazobenzene, Lumogen orange 240, and guaiazulene (GAZ) with the melted phase change material; and forming a mixture of the phase change material and the solid particles from at least one of (2,2,6,6-Tetramethylpiperidin-1-yl)oxyl (TEMPO), azobenzene (AZOB), 4-Nitro-4-dimethylaminoazobenzene, Lumogen orange 240, and guaiazulene (GAZ).

A method is disclosed of converting photons into mechanical energy, the method comprising: melting a solidified mixture of a phase change material and at least one of (2,16,6-Tetramethylpiperidin-1-yl)oxyl (TEMPO), azobenzene (AZOB), 4-Nitro-4-dimethylaminoazobenzene, Lumogen orange 240, and guaiazulene (GAZ) is guaiazulene (GAZ) with a photon source; and displacing a piston with the melted mixture of the phase change material and at least one of (2,2,6,6-Tetramethylpiperidin-1-yl)oxyl (TEMPO), azobenzene (AZOB), 4-Nitro-4-dimethylaminoazobenzene, Lumogen orange 240, and guaiazulene (GAZ) is guaiazulene (GAZ).

In accordance with an embodiment, the methods as disclosed herein can be applicable to any small molecule that can survive cycling in a PCM without undergoing phase separation. In general, the molecule must be small enough to not interfere with the largescale packing of the PCM molecule, for example, long chain alkanes in waxes, which prevent the molecule from interfering with the phase change behavior of the PCM, for example, by inducing large shifts in the melting temperature.

In accordance with an embodiment, the methods as disclosed herein can also be applicable to any actuator structure that incorporates a PCM active element. In addition, the detailed architecture of the actuator can take many forms. For example, the actuator can rely on a rubber boot to transfer wax expansion to a piston, but other actuators, for example, can rely on a flexible membrane or encapsulation inside a flexible matrix, like a metal drum.

BRIEF DESCRIPTION OF THE DRAWINGS

FIGS. 3A and 3B are illustrations of differential scanning calorimetry curves, and wherein FIG. 3A is pure eicosane and FIG. 3B is a 14.3 mM GAZ/eicosane mixture.

FIG. 8C illustrates the GAZ/eicosane filled wax actuator was cycled up to 10 times to demonstrate that the actuator experiences no fatigue regardless of method of melting, and wherein the laser power was 1.0 W.

DETAILED DESCRIPTION

Organic phase change materials can be used in actuators like wax motors. The solid→liquid phase transition that drives expansion can be induced by resistive heating that requires an electrical connection. The use of light to generate a phase change provides a non-contact way to power wax motors. In accordance with an embodiment, it is disclosed that small molecules can act as absorbers to enable a photoinduced solid→liquid melting transition in eicosane, a low molecular weight phase change material (PCM). In accordance with an embodiment, three different small molecule absorbers can be utilized: (2,2,6,6-tetramethylpiperidin-1-yl)oxyl (TEMPO), azobenzene (AZOB), 4-Nitro-4-dimethylaminoazobenzene, Lumogen orange 240, and guaiazulene (GAZ). The GAZ/eicosane mixture is characterized in more detail because its absorption extends out to 750 nm, opening up the possibility of using near-infrared diodes as the photon source. In accordance with an embodiment, the GAZ/eicosane composite can be incorporated into a commercial wax motor assembly and 532 nm laser light can be used to lift up to 400 g. The temporal response, work and force output, and efficiency are measured, and no loss of lifting capability or degradation was observed after 10 cycles of irradiation. The incorporation of small molecules with low-energy absorption features into phase change materials can provide a general way to make light powered wax motors.

Figure 1:
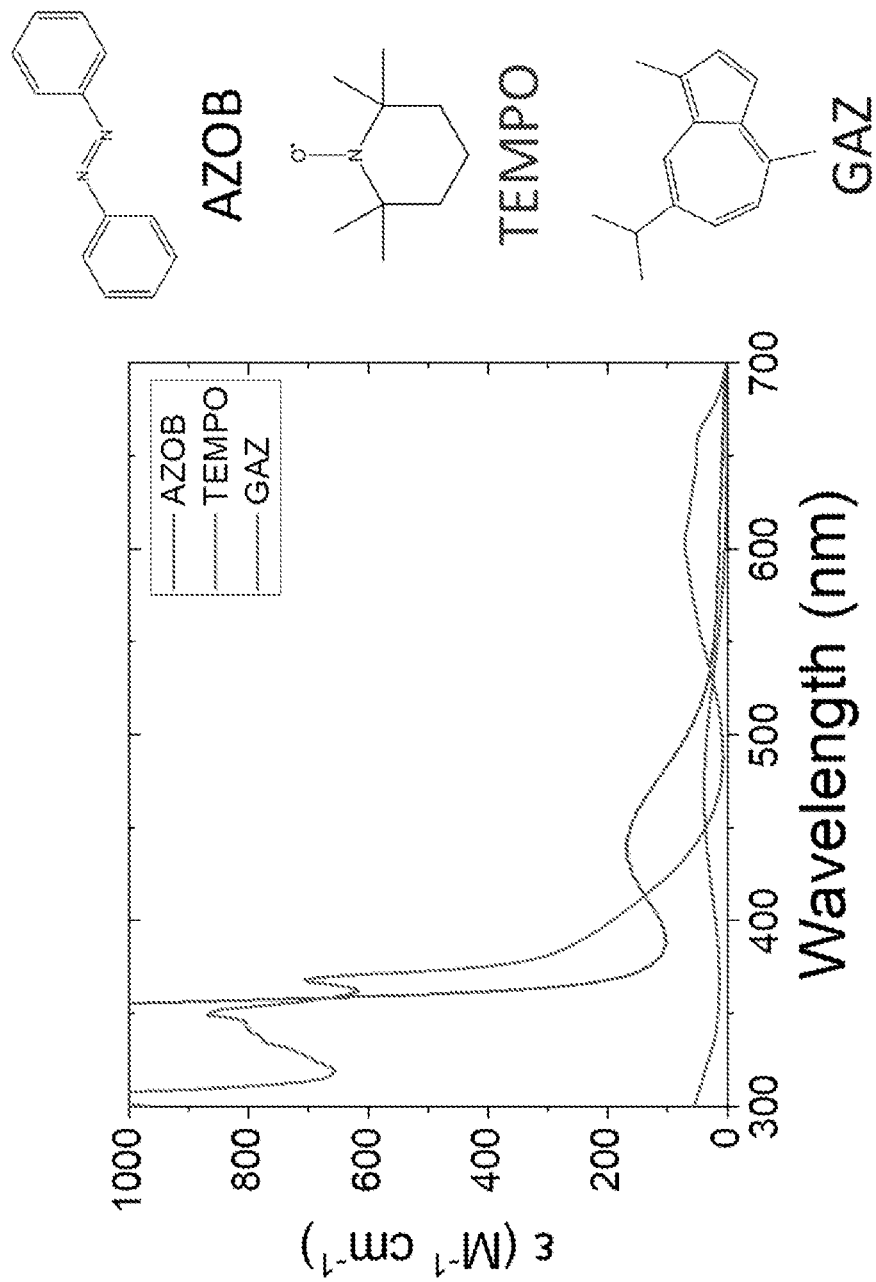
FIG. 1 is an illustration of a UV-Vis absorption spectra of the small molecule absorbers in eicosane, and wherein the chemical structures of AZOB, TEMPO, and GAZ are shown to the right.
Figure 2:
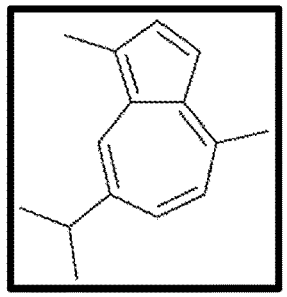
FIG. 2 is an illustration of UV-Vis absorption spectra of small molecule absorber in melted (liquid) eicosane, and wherein the chemical structures of Guaiazulene (GAZ), 4-Nitro-4-dimethylaminoazobenzene (AZO Dye), and Lumogen orange 240 (Lumogen Orange) are shown to the right.
Figure 2:
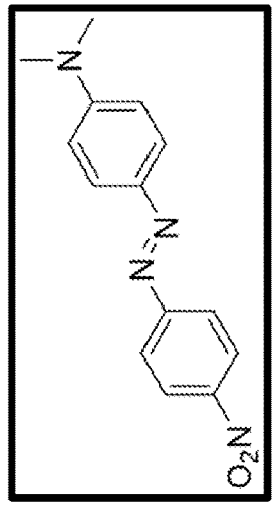
Figure 2:
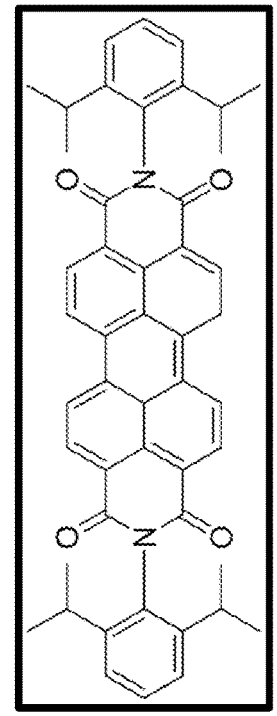
Figure 2:
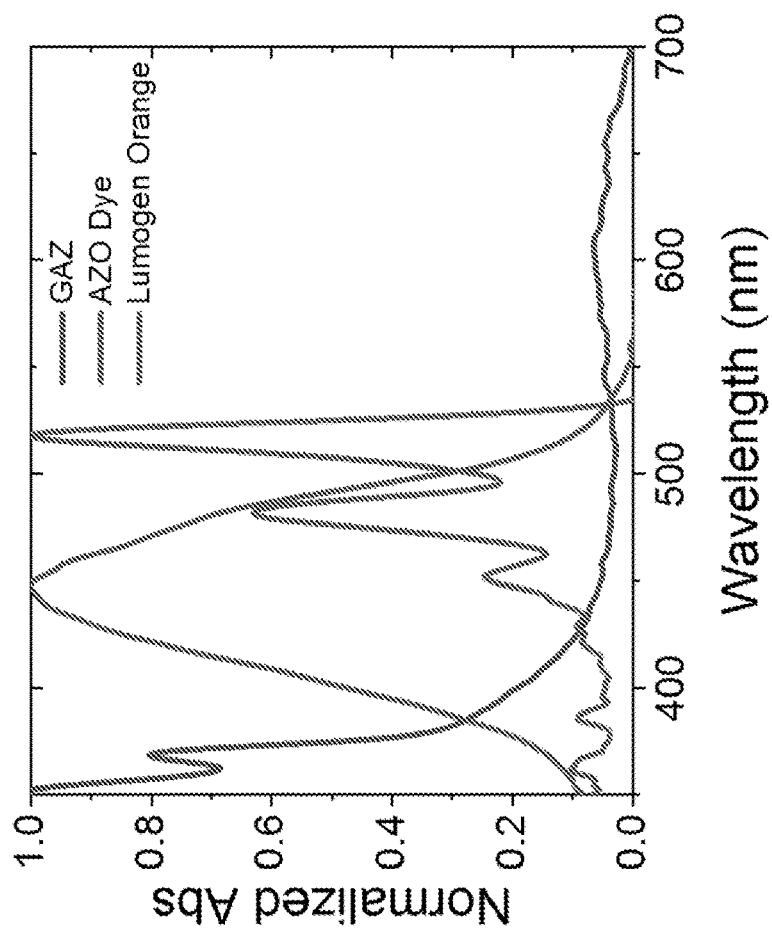
Figure 9:
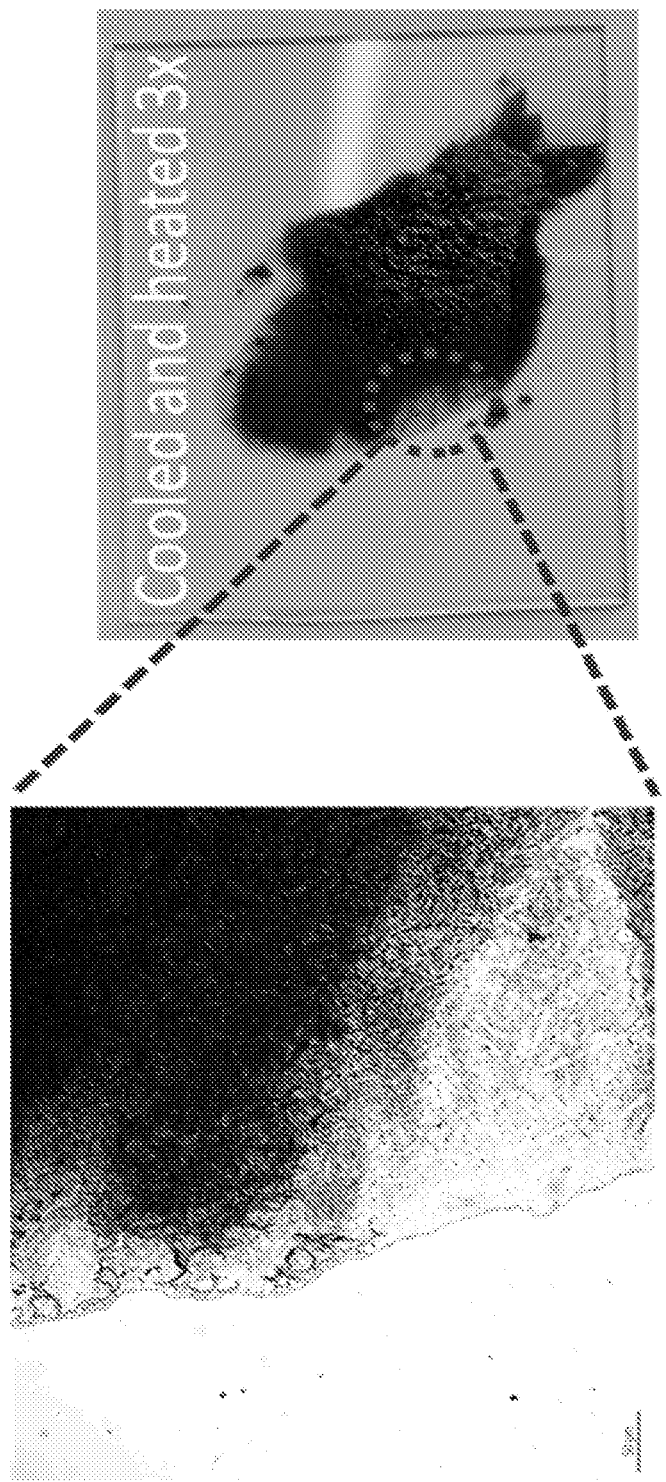
FIG. 9 illustrates an Au nanoparticle/eicosane film after 3 melt-resolidification cycles, and wherein the edges of the film became colorless, indicating that the AuNPs phase separated from eicosane, and wherein the phase separation illustrates how nanoparticle composites can be unstable under heating and cooling cycles.
Figure 10:
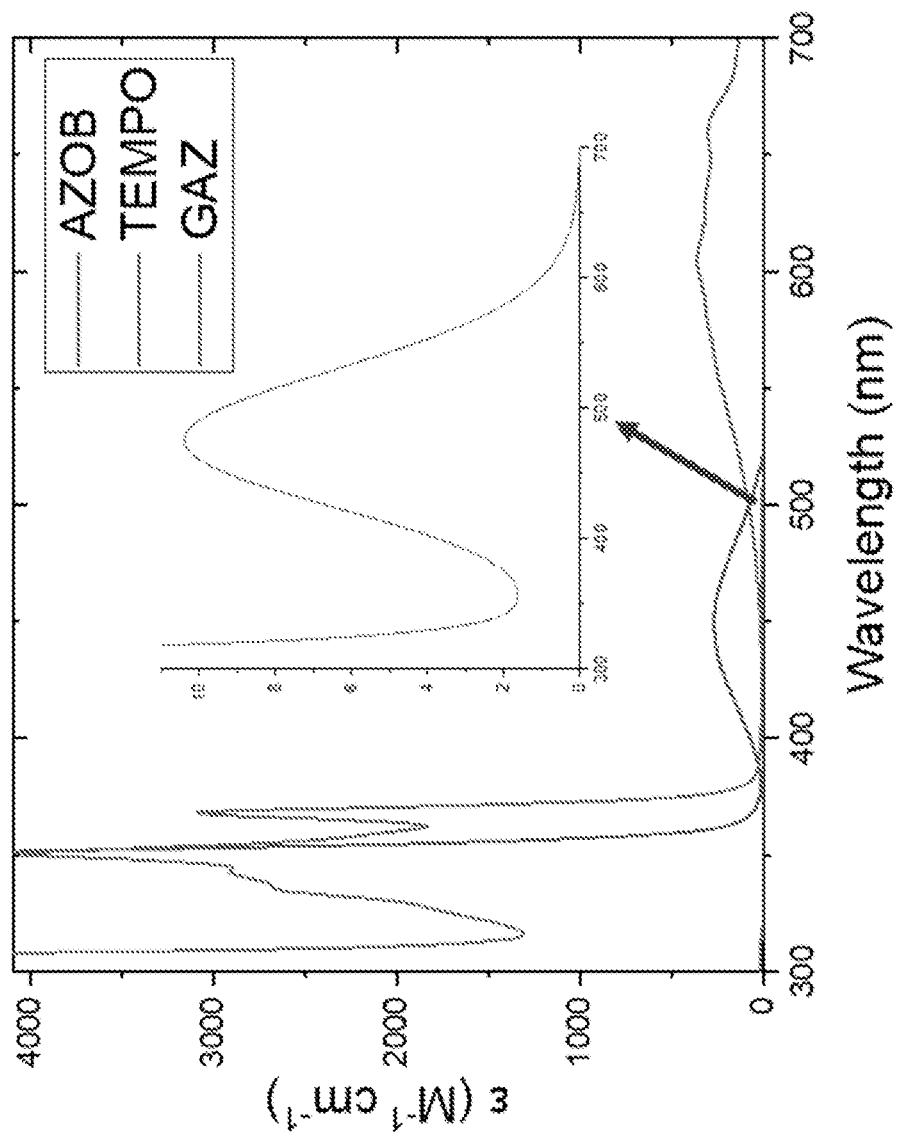
FIG. 10 is a UV-Vis spectrum of the AZOB, TEMPO, and GAZ in cyclohexane.
Figure 11:
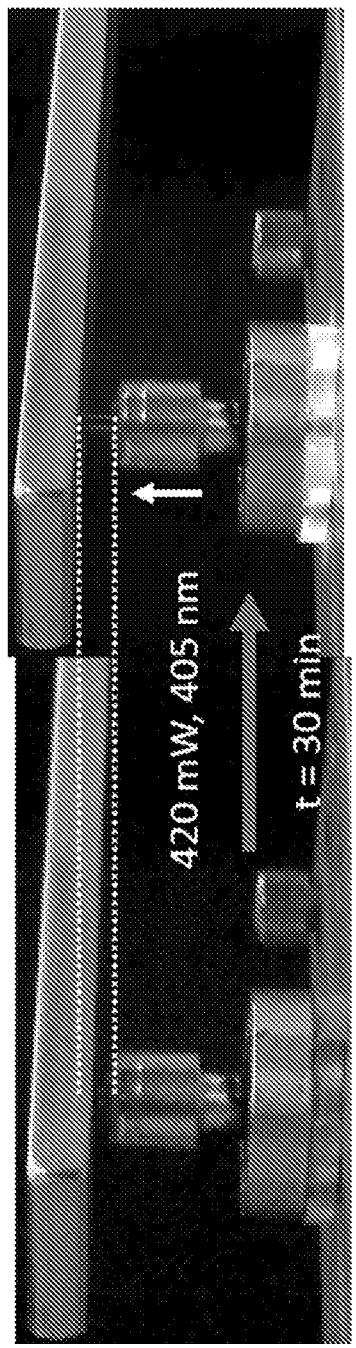
FIG. 11 is an illustration of a 3.8 mM AZOB filled actuator shown lifting the Al lever, and wherein the irradiation wavelength used was 405 nm at 420 mW.
Figure 11:
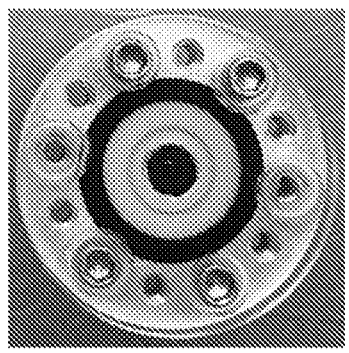
Figure 11:
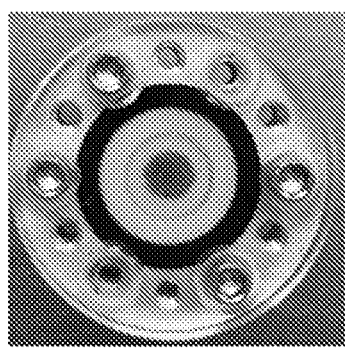
Figure 12:
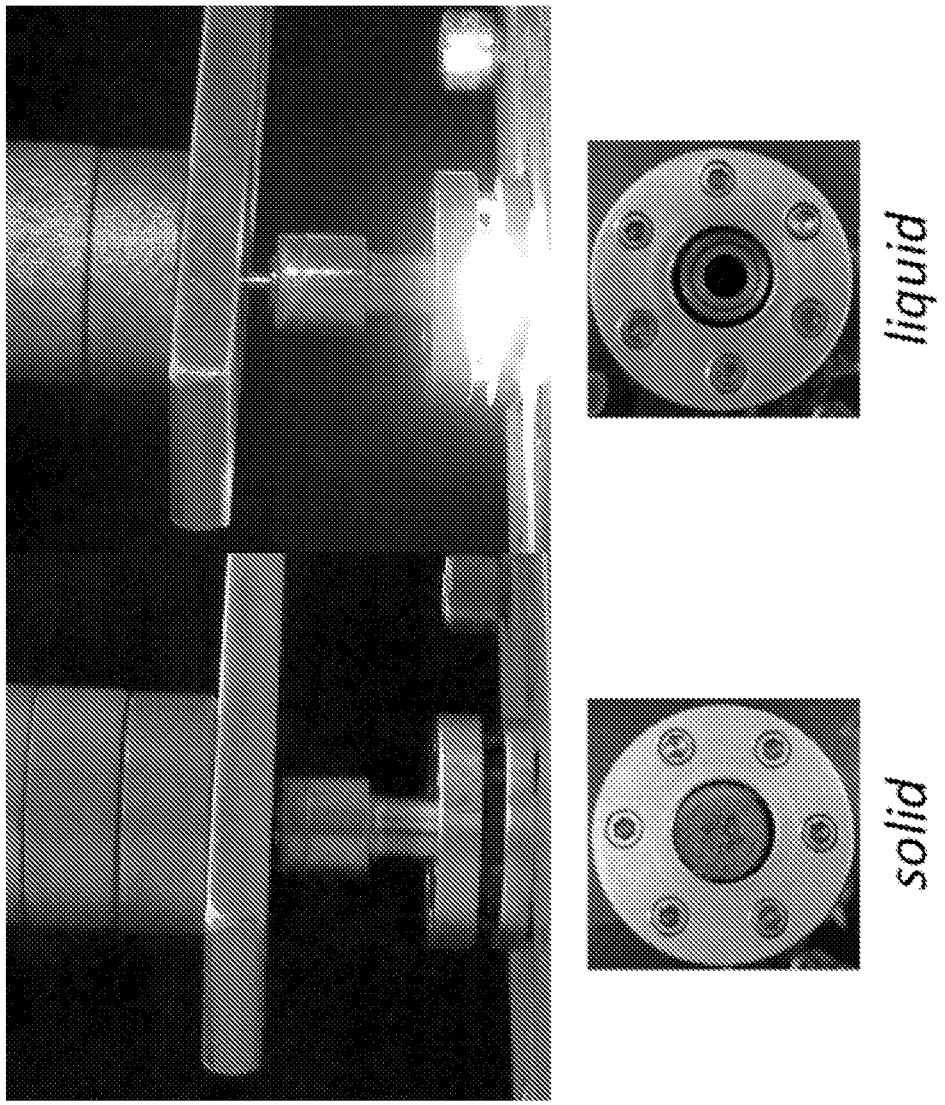
FIG. 12 is an illustration of a 14.3 mM GAZ filled actuator shown lifting the Al lever with an additional 400 g, and wherein the irradiation wavelength used was 532 nm at 2 W.
Figure 13:
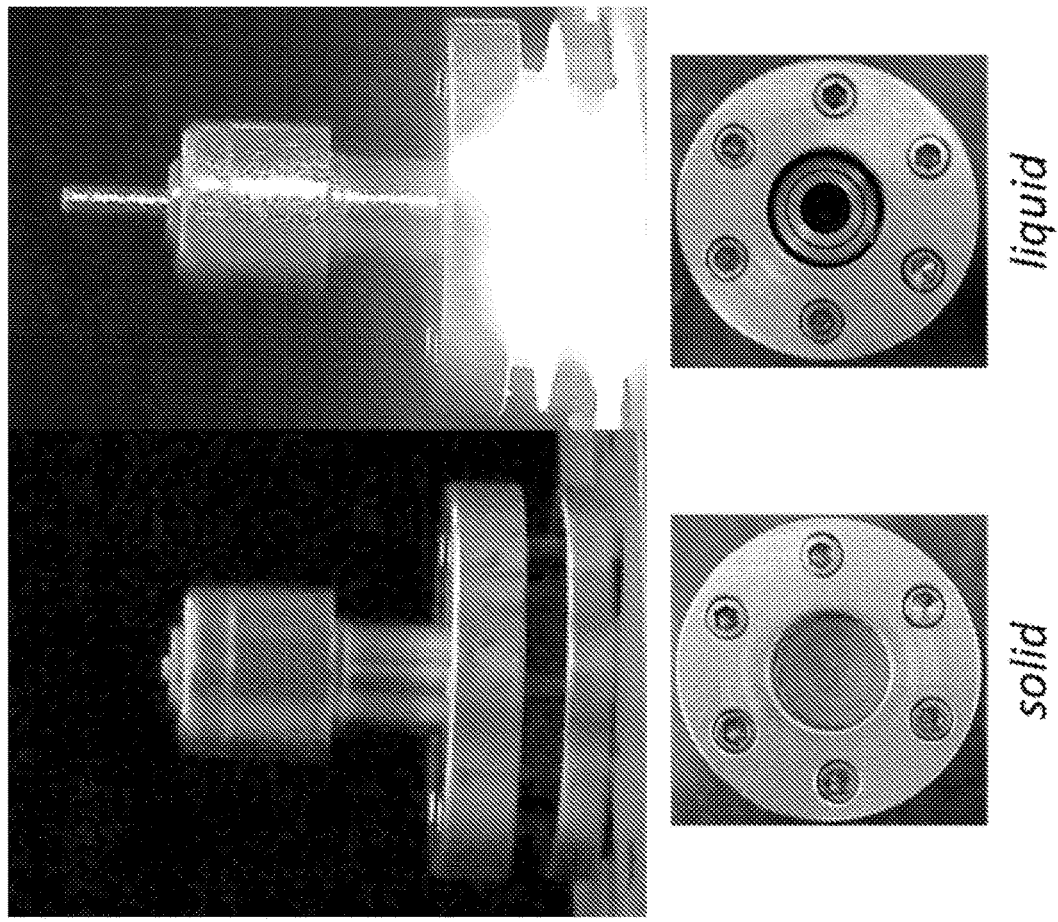
FIG. 13 is an illustration of a 81.5 mM TEMPO filled actuator shown in the "off" and "on" state, without any loading, and wherein the irradiation wavelength used was 532 nm at 2 W.

Long-chain alkanes tend to crystallize easily, causing large solutes like Au nanoparticles to phase separate after a few heating-cooling cycles (FIG. 9). Even when switched to molecular solutes, their solubility was found to be strongly dependent on size. For example, the maximum pyrene solubility in eicosane was found to be approximately (—) 50 mM, while that of the slightly larger perylene was limited to approximately (—) 0.5 mM. Other larger dye molecules, like (3-carotene and tetracene, had even lower solubilities. In order to identify viable candidates that could act as photothermal agents, small molecules that had 1) at most two aromatic rings; 2) absorption spectra that extended at least into the near ultraviolet (beyond 400 nm); and 3) low fluorescence quantum yields due to efficient internal conversion (IC) were identified. In accordance with an embodiment, different small molecule absorbers: AZOB, TEMPO, and GAZ were studied. All three, for example, had good solubility ($>10^{-2}$ M) in eicosane, and their absorption spectra and chemical structures are shown in FIG. 1. The absorption spectra of AZOB, TEMPO, and GAZ in eicosane are very similar to those in alkane solvents (FIG. 10), with relatively low absorption coefficients ($<500$ $M^{-1}$ $cm^{-1}$) above 400 nm, necessitating the use of high concentrations in the wax. Rapid IC in AZOB is facilitated by an excited state conical intersection that also enables trans→cis isomerization, and this allows it to function as a photothermal agent. TEMPO benefits from its radical structure that leads to a low energy absorbance. In accordance with an embodiment, since one was not able to detect any fluorescence from this molecule, it was assumed that its excited state relaxation is also dominated by IC. Lastly, GAZ, like azulene, is a non-alternate aromatic hydrocarbon with a weak, low-energy absorption and rapid IC. Taken together, these molecules embody three different physical mechanisms to achieve absorption at longer wavelengths, which can be desirable for a small molecule photothermal agent. Of these three, GAZ was a promising candidate because of its low cost and absorption spectrum that extends almost to 800 nm. In the following disclosure, the experiments concentrate on characterizing the performance of GAZ, however, all three molecules are capable of supporting photoactuation of the wax motor, as shown, for example, FIGS. 11-13.

Figures 3A, 3B:
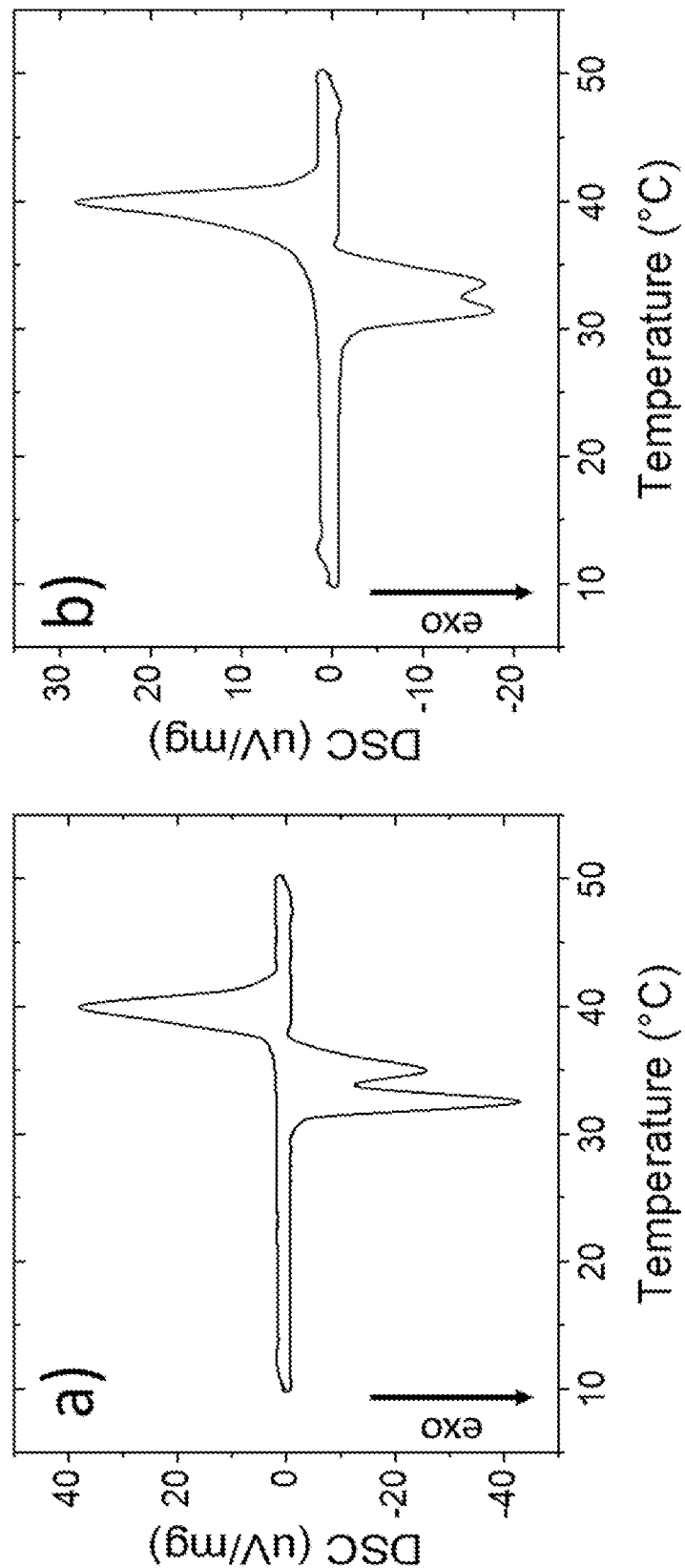

In accordance with an embodiment, the low absorption coefficient of GAZ's $S_0$-$S_1$ transition in the visible motivated the use of relatively high concentrations of 10 mM or more in the eicosane. The first question was whether the presence of the GAZ at these concentrations had any effect on the phase behavior of the wax. FIGS. 3A and 3B compare the DSC curves for neat eicosane and a mixture with [GAZ] =14.3 mM.

In accordance with an embodiment, a single endothermic peak is seen during the heating stage, and the onset melting temperature ($T_m$) for eicosane and the GAZ doped sample was found to be 37.4±0.3° C. and 36.2±1.2° C., respectively which indicates that the doping of small molecules at the millimolar regime does not change the melting temperature to within the error of the measurement. The two exothermic peaks seen during the cooling cycle correspond to transitions from the liquid→rotating phase and rotating phase→crystalline phase. In accordance with an embodiment, the GAZ had only a small effect on the resolidification behavior, shifting both steps lower in temperature by 1.4° C. and 1.1° C., respectively, which can be rationalized in terms of a colligative property in which the GAZ molecules inhibit alkane crystallization. Overall, high concentrations of GAZ have only a small effect on the phase change properties of eicosane.

Figures 4A, 4B:
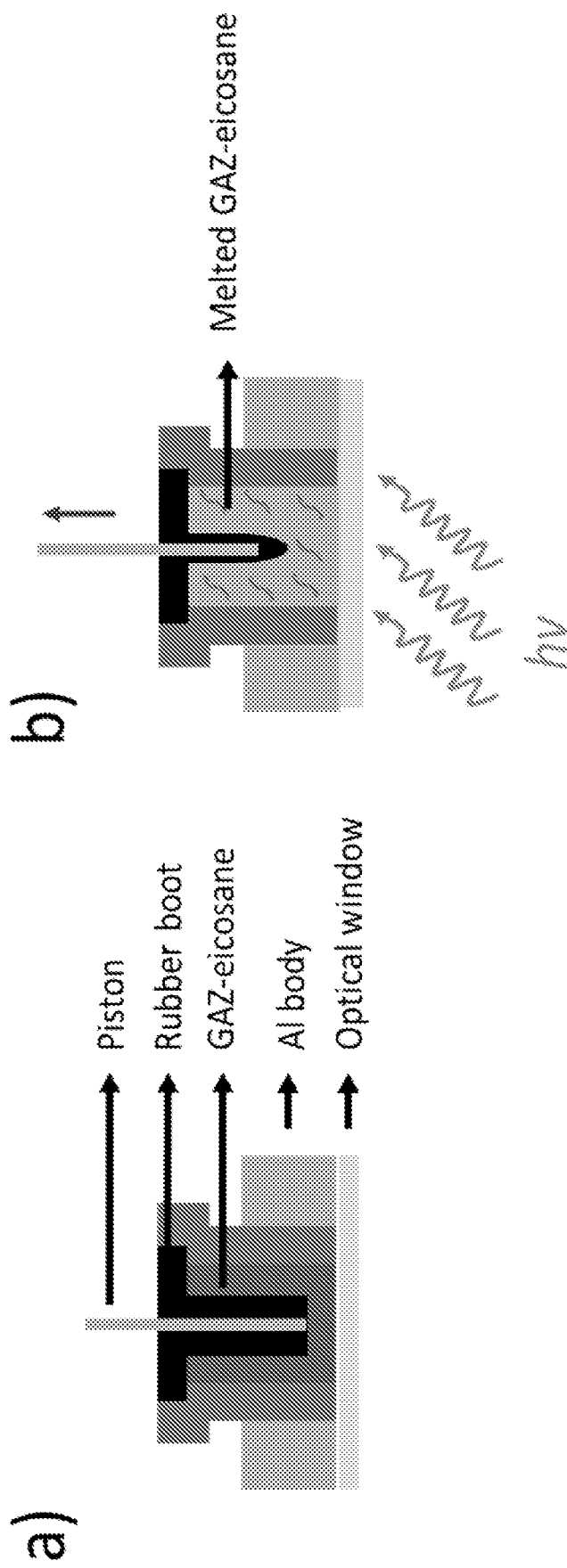
FIG. 4A is a cross sectional schematic of the modified wax motor assembly in the "off" state before light is applied.
FIG. 4B illustrates that during the "on" state, the wax is melted with incident 532 nm laser light and the molten wax compresses the rubber boot, which vertically displaces the piston.
Figure 14:
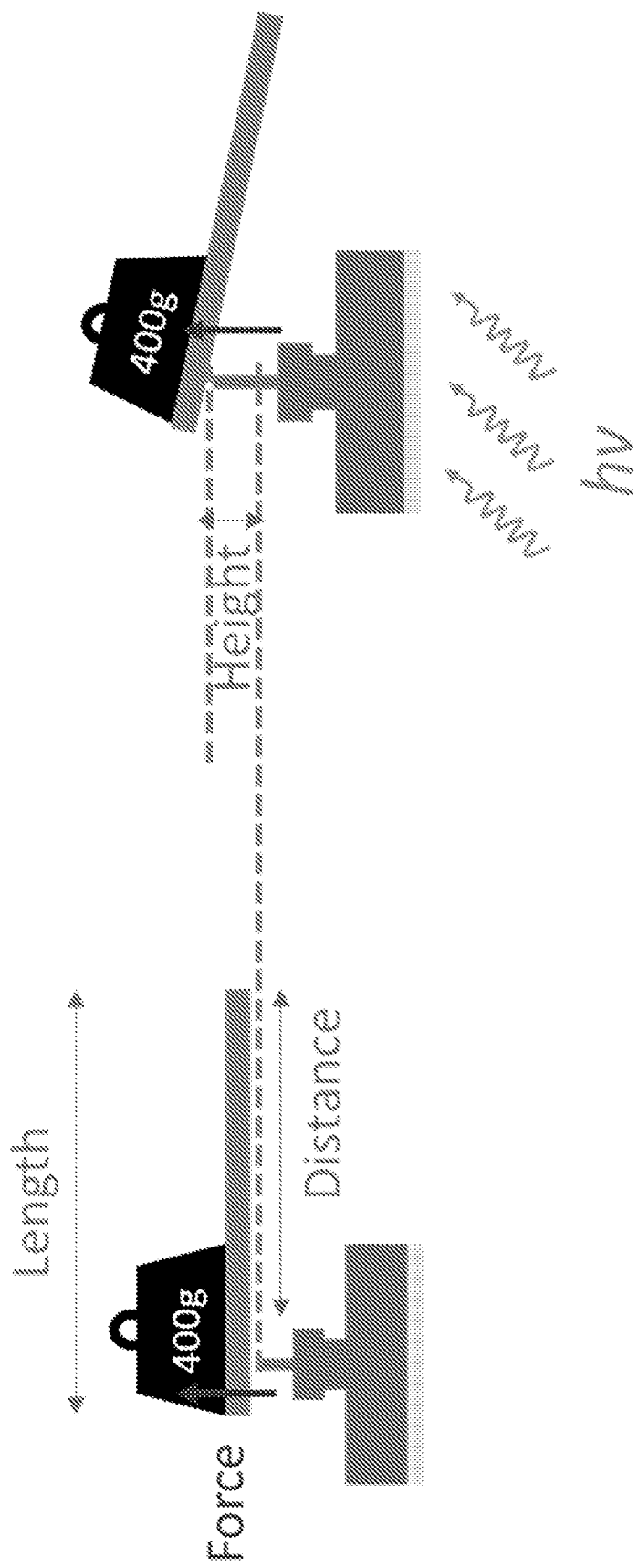
FIG. 14 is a diagram of the piston pushing against the Al lever.

In accordance with an embodiment, exposure of a solid GAZ/eicosane mixture on a glass slide to intense 532 nm laser light could induce melting within 1 minute. In order to assess whether this light-induced melting could be harnessed to do useful actuation, a commercial thermal wax motor was modified so the interior could be illuminated by laser light. A schematic of the modified wax motor is shown in FIG. 4A. Expansion of the wax after melting squeezes a rubber boot that in turn pushes up a metal rod (FIG. 4B), which is a relatively simple piston-type of wax motor commonly used to open valves in cooling systems. To demonstrate the performance of the GAZ/eicosane mixture, the actuator was mounted so it could push up against a weighted lever. The force and work output can be calculated from the vertical displacement of the lever (FIG. 14). For example, the total force, $F_{load}$, can be calculated with the following equation:

$$F_{load} = \frac{length \times mass_{Al\ lever} \times g}{2 \times distance} + mass_{weight} \times g \tag{1}$$

where g is the acceleration of gravity and $mass_{weight}$ is the additional weight placed on top of the lever. The work, $W_{melt}$, is then calculated from the equation:

$$W_{melt} = F_{load} \times height \tag{2}$$

Figure 5:
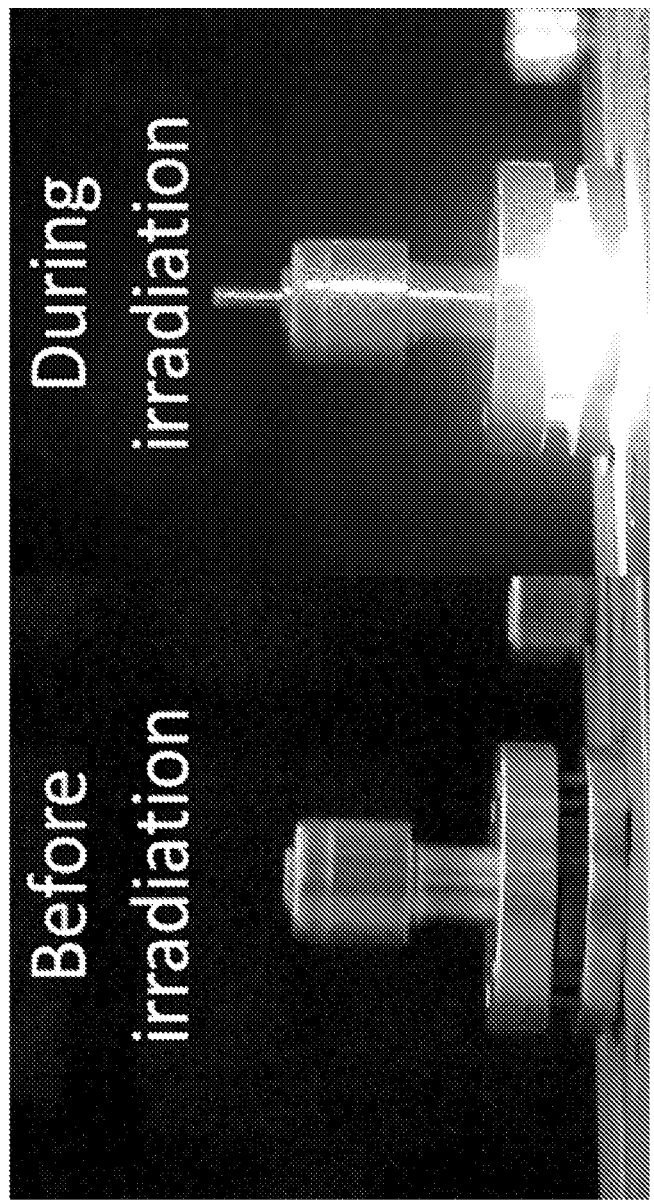
FIG. 5 are still images of the of the GAZ/eicosane filled wax motor in the "off" (before light, piston retracted) and "on" (532 nm laser incident, piston extended) state.

Images of the actuator before irradiation (retracted) and after irradiation (extended) are shown in FIG. 5.

In accordance with an embodiment, the maximum actuator displacement varied by up to 30% from device to device due to variations in filling and the condition of the rubber boot, which degraded after many uses due to laser damage. Thus, data from different devices had slightly different maximum extension values, as seen in the data below. In accordance with an embodiment, it was found that the amount of heat deposited into the device was found to depend only on the laser power and not the intensity, since both small and large beam diameters resulted in the same behavior as long as the beam spot was contained entirely within the wax. For this reason, laser conditions are reported in units of power (W) rather than intensity (W $cm^{-2}$).

Figures 6A, 6B:
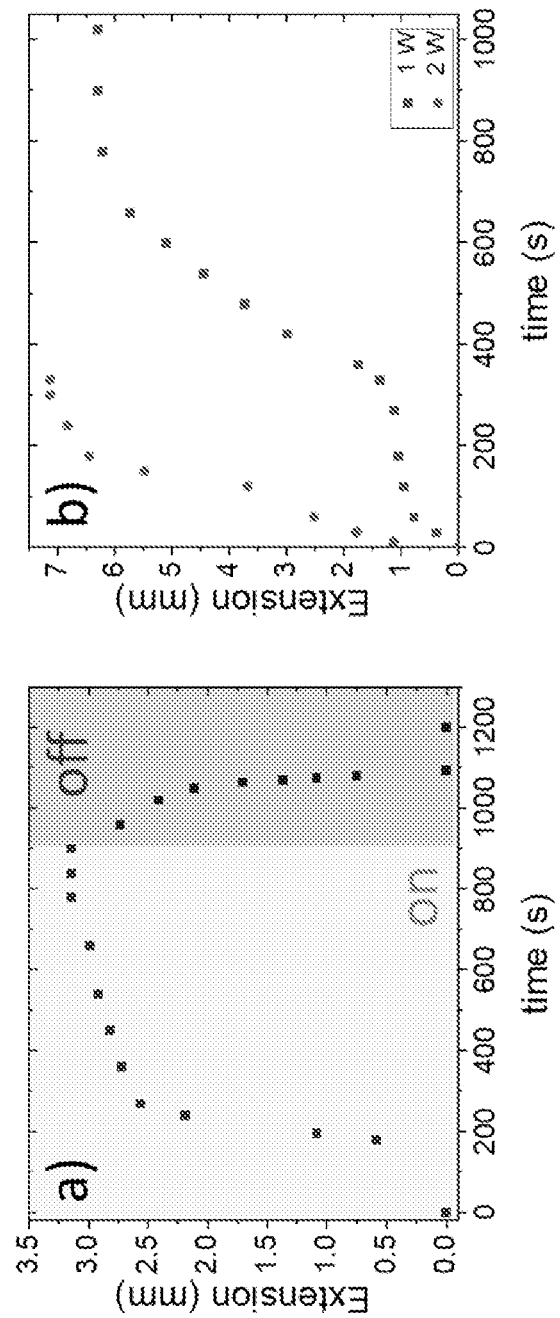
FIG. 6A is a time-dependent extension of a loaded (400 g) wax actuator after the laser (2 W) is turned on (green region) and after the laser is turned off (red region), the actuator takes about 15 minutes to reach maximum extension, then returns to its initial position within 5-minutes.
FIG. 6B is a time-dependent extension (no load) for two different laser powers: 1 W (black) and 2 W (red), and wherein the maximum extension is reached more quickly for higher laser powers and less loading.

The time-dependent extension and retraction for an actuator with a load (4.3 N) are shown in FIG. 6A. After the laser is turned on, there is an induction period while the wax heats up, then an extension as it melts which is maintained as long as the laser is on. After the laser is turned off, the piston returns to its original position on a timescale of minutes. In FIG. 6B, the dynamics of the initial extension are shown for two different laser powers without any loading. Once the laser was turned on, the displacement occurred in two steps. First, there was a rapid initial extension of 1 mm to 2 mm that occurred within seconds, followed by a slower extension that took place over a timescale of minutes. Increasing the laser power could compress these dynamics into a shorter time window, but the general form remained the same. Note that at the higher laser power, the initial extension (approximately 1 mm) appears instantaneous on this graph. The extension behavior was interpreted in terms of a two-step melting process, first, there is an initial melting and expansion of the wax adjacent to the transparent window that directly absorbs the laser light, leading to a small initial extension. After this initial melting, heat diffusion through the wax and metal casing eventually causes the rest of the wax to melt, resulting in full extension of the piston.

After the laser is turned off, the wax slowly cools and resolidifies, leading to a retraction of the piston over the course of 5 minutes. The rate of recovery to the original position did not depend on the laser power seen by the actuator, as expected for a purely thermal process. The slow recovery time is expected since resolidification is governed by both heat loss and by nucleation in the melt. Eicosane has the tendency to supercool, as evidenced by the DSC curves in FIGS. 3A and 3B, so the actuator must cool below $T_m$ before it returns to its original position. A complete description of the time-dependent extension and retraction of the piston would require detailed modeling of the thermal transport within the device.

Figures 7A, 7B:
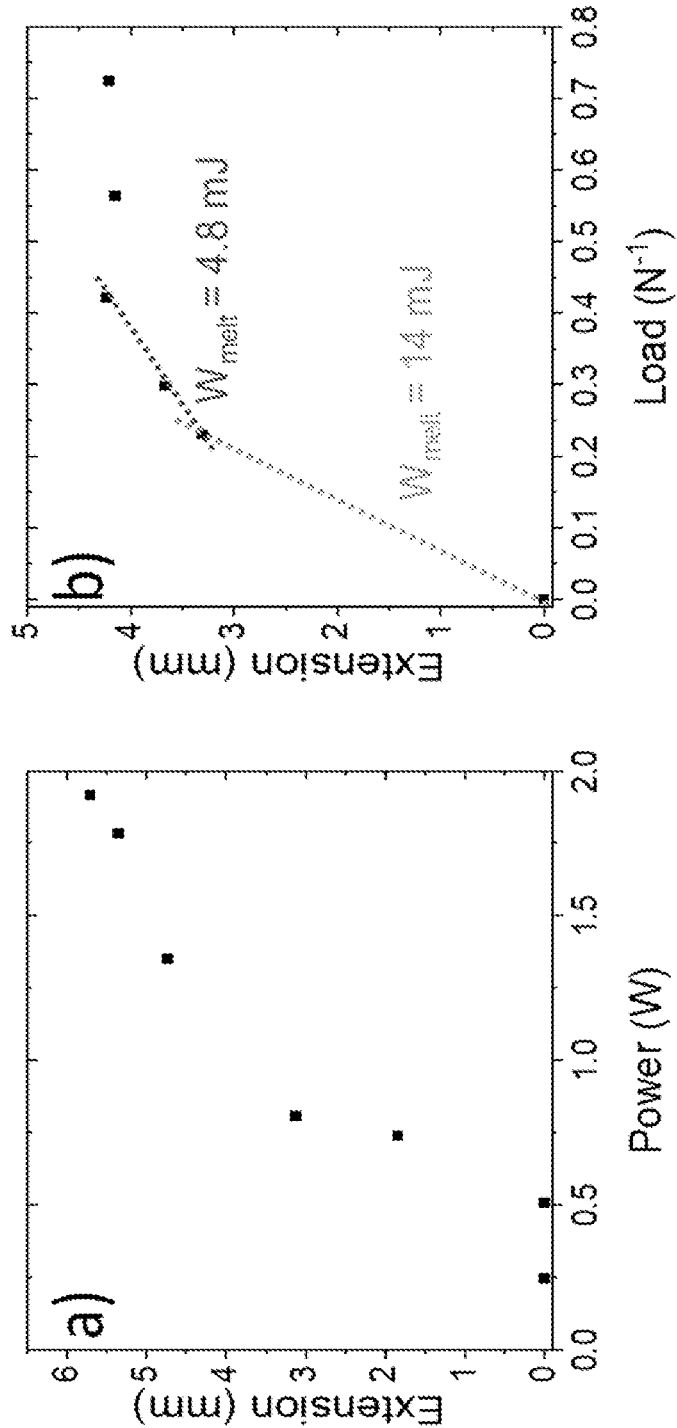
FIG. 7A is a plot of piston extension versus 532 nm laser power, and wherein at lower powers (≤0.5 W) the laser is unable to melt the wax, hence no extension is observed.
FIG. 7B illustrates for loads ≤200 g, the wax actuator always reached maximum extension, however a linear trend (purple) can be observed with heavier loads, and the trend in blue is extrapolated assuming that as $1/F_{load} \rightarrow 0$ then extension $d \rightarrow 0$, giving a slightly larger slope $W_{melt}$.

In accordance with an embodiment, a plot of the maximum piston extension versus laser power for a typical device is given in FIG. 7A. The power dependence can be understood qualitatively in terms of a competition between laser input and thermal loss. For a perfectly insulated actuator, even a low power laser would eventually deposit enough energy to melt all of the wax and achieve full extension. But heat loss to the surroundings, both air and the contact points of the metal casing to the support structure, competes with the laser heating, so lower laser powers cannot build up sufficient heat to attain $T_m$, which leads to a threshold (~0.5 W) below which no extension can be observed. Once this threshold is reached, there is partial melting and the extension increases roughly linearly with laser power. At the highest powers, full melting was achieved, and the extension saturates at its maximum value. For an oven-heated actuator, where the motor and its surroundings are held at the same temperature, the competing heat loss is not a factor and full extension is always attained.

The maximum extension also depends on the opposing force. FIG. 7B shows an extension versus load curve for an actuator exposed to 2 W laser irradiation that generates full extension without a load. As the load on the lever is increased, the piston can no longer reach its full extension. For example, a load of 0.400 kg resulted in an opposing force of 4.3 N. Application of a 2 W laser beam for 780 seconds resulted in a 3.3 mm displacement, or 0.0142 J of work. The overall efficiency of the actuation, defined as the work output divided by the laser energy input, can be calculated to be 0.0142 J/1560 J=$9.1\times10^{-6}$. In this regime, if one assumes that the eicosane melting generates a constant amount of work $W_{melt}$, then the extension d is related to $W_{melt}$ by:

$$W_{melt}=F_{load}\times d \quad (3)$$

where $F_{load}$ is the force due to the weighted lever. A plot of d versus $1/F_{load}$ should be linear with a slope of $W_{melt}$. In accordance with an embodiment, since it was not possible to balance sufficient weight on the lever to completely prevent any extension, so that one could not approach the $1/F_{load}=0$ limit, where one would expect d→0. The data in FIG. 6B can be analyzed in terms of two different regimes. In the low $F_{load}$ regime (large $1/LF_{load}$ values), a slope $W_{melt}$=4.8 mJ was extracted. If the line from the last point is forced to go through the origin, a slightly higher slope of 14 mJ for the high $F_{load}$ regime can be obtained. From the fits in FIG. 7B and a wax volume of 0.1 cm$^3$, a work density in the range 0.048-0.14 J cm$^{-3}$ can be extracted, which is larger than values, for example, reported for liquid crystal elastomer sheets and approaching the values for paraffin-infused carbon nanotube yarn. However, these values are below the limit of thermal alkane PCM systems, which can reach up to 9 J cm$^{-3}$, suggesting there is considerable room for improvement.

Figures 8A, 8B, 8C:
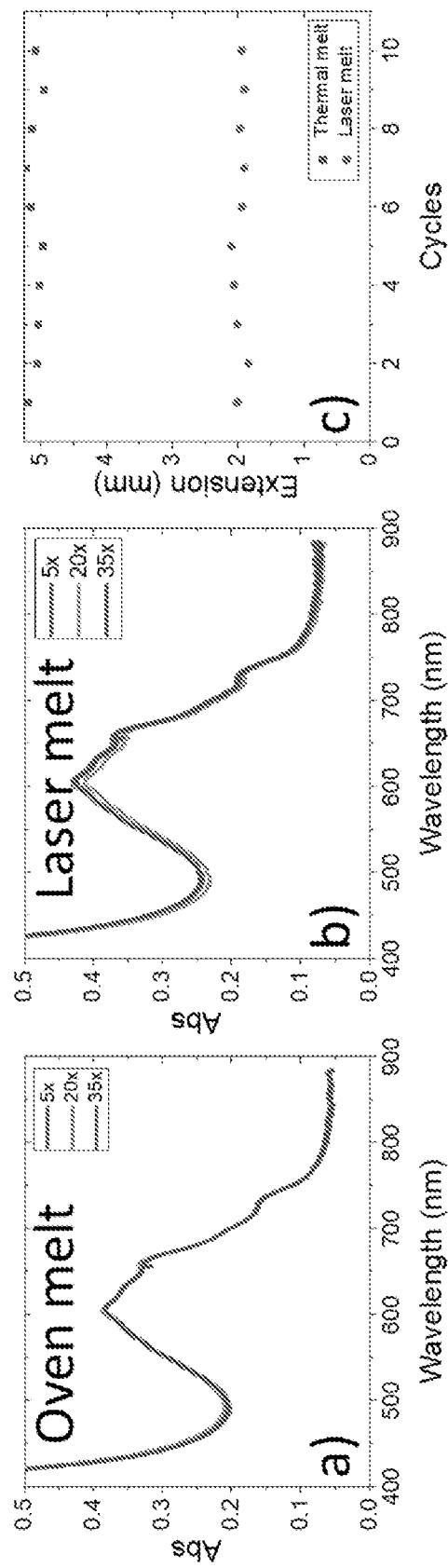
FIGS. 8A-8C are illustrations of absorption spectra of the liquid GAZ/eicosane mixture which demonstrate the chemical stability from both thermal (FIG. 8A) and optical melting (FIG. 8B)

Finally, to assess the chemical stability of the GAZ/eicosane mixture, the GAZ/eicosane mixture was subjected to repeated melt-solidification cycles using both thermal (oven) and laser heat sources. In both cases, the GAZ absorption showed no loss of intensity after 35 cycles (FIGS. 8A and 8B). The chemical stability of the GAZ/eicosane mixture leads to stable mechanical extension, as shown in FIG. 8C for both laser and oven heating. The laser heated actuator extension was 2.0 mm with a standard deviation of ±0.2 mm, or about 10%. Note that the laser power was lowered so that only partial melting (and less than full extension) was achieved. This avoided full melting, which would lead to an artificially stable data since the extension would always saturate at its maximum value, as is the case for the oven-heated actuator. There was no sign of diminished response after 10 cycles for either the oven or laser heated actuator. This result shows that controlling the laser power provides a reproducible way to control the actuator extension.

Since both resistive and laser heating can drive wax melting and power a linear actuator, it is worth considering the potential advantages of the laser heating approach. As disclosed, light has some advantages as a non-contact power source. But a second advantage is that light can bypass the actuator casing and directly heat the encapsulated wax through a transparent window. During laser irradiation, it was noted that the initial actuator extension occurred while the casing was still cool to the touch. At longer times, after the body of the actuator had warmed up, the rest of the wax melted, and full extension was achieved. For resistive heating, on the other hand, the heating element is attached to the outside of the actuator casing, and the entire device must be heated above $T_m$ before actuation can begin. The ability to selectively heat the PCM without directly heating the device casing or its surroundings may prove useful in some applications.

In accordance with an embodiment, improvements to the photothermal wax motor can include improved thermal isolation of the wax from the actuator body, which would result in faster extension and less energy wasted in heating the surroundings. However, the contraction of the actuator after removal of light would slow down, since it requires heat loss. In addition, it would be desirable to modifying the actuator structure, since the compressibility of the rubber boot is one factor that limits the work output. There are several alternative geometries for wax motor, and also choosing a different photothermal agent could be considered. For example, it is possible to tune the absorption of azulene derivatives by adding different substituents. In accordance with an embodiment, choosing a different PCM host material, possibly by drawing on the extensive work already done in the field of energy storage could be performed.

In accordance with an embodiment, using a blend of small molecule absorbers in an alkane PCM, a practical light-powered wax motor can be realized. The temporal response, work and force output, and cyclability of this motor have been characterized and the path forward to optimize these figures-of-merit seems straightforward. The availability of small, highly soluble aromatic molecules with low-energy absorption features suggests that photothermal solid→liquid phase transitions could provide a general approach for making light-powered actuators.

EXPERIMENTAL

Sample preparation: n-Eicosane, TEMPO, and azobenzene (AZOB) were purchased from Sigma-Aldrich. Guaiazulene (GAZ) was purchased from TCI Chemicals. All chemicals were used without further purification. GAZ-eicosane mixtures were prepared by melting the eicosane (3.8773 g, 4.92 mL) and mixing in solid GAZ particles (13.9 mg, $7\times10^{-5}$ mol). The molten wax mixture was allowed to equilibrate for at least 1 hour before cooling. AZOB and TEMPO wax mixtures were prepared in the same fashion.

Spectroscopic methods: A 1-mm path length quartz cell was used for the spectroscopic measurements. An Agilent Cary-5000 was used to measure the steady state UV-Vis absorption of solid GAZ-eicosane mixtures. For the cycling experiments, in order to avoid a variable scattering background from the solid, the GAZ absorption was measured in the molten state. In order to measure the melt quickly before resolidification, an Ocean Optics USB4000 was used. OceanView software was used to operate the spectrometer with the wavelength window of 400-800 nm. A heat gun and a 532 nm laser (2 W output) was used to thermally and optically melt the mixture, respectively.

Differential scanning calorimetry: Melting points of the GAZ-eicosane mixture and pure n-eicosane were measured using a Netzsch 214 Polyma differential scanning calorimeter. A temperature range of 10° C.-50° C. was used with a 5° C./min heating rate, 1-min holding, and 5° C./min cooling rate. The samples were heated and cooled for three cycles and the onset melting temperatures were collected.

Figure 15:
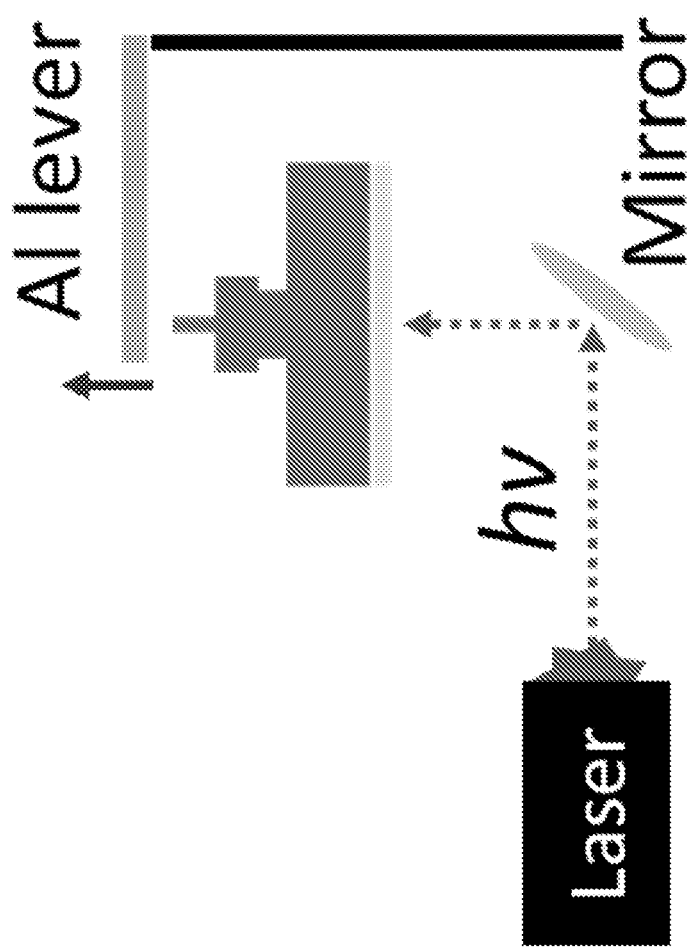
FIG. 15 is a schematic of the apparatus used to measure the work output of the wax actuator, and wherein additional weights were placed on top of the Al lever to increase the loading.

Device fabrication & work output measurement: A commercially available wax motor (Honda 16620-ZOY-M41 Thermostat) was modified to incorporate the GAZ-eicosane mixture and allow optical access. Briefly, the actuator consists of a rubber boot and a metal piston. The actuator was pressed into an aluminum disk which allowed for an optical window to be attached. The actuator was then filled with the molten wax mixture and allowed to solidify. Excess wax was scraped away, and the optical window was clamped with an O-ring to prevent leakage. A lever apparatus was built to measure the displacement and work output of the actuator (FIG. 15). Digital calipers were used to measure the displacement of the piston to within 0.02 mm. A continuous wave 532 nm laser was used as the irradiation source for the photothermal melting.

Preparation of AZOB and TEMPO eicosane mixtures: The general procedure for the sample preparation is described in the main text. AZOB (3.5 mg, 1.92×10–5 mol) was mixed with eicosane (3.9852 g, 5.0535 mL) to make a 3.8 mM AZOB/eicosane composite. TEMPO (85.2 mg, 0.55 mmol) was mix with eicosane (5.2790 g, 6.6941 mL) to make an 81.5 mM composite.

Work measurement apparatus: The wax actuator was placed on a raised platform and a mirror below directed the laser upwards so that the contents within the actuator could be irradiated. Once the material inside the actuator melted, the wax mixture squeezes the rubber boot, and the piston pushes up against the aluminum lever and the work generated by the actuator could be quantified.

Figure 16:
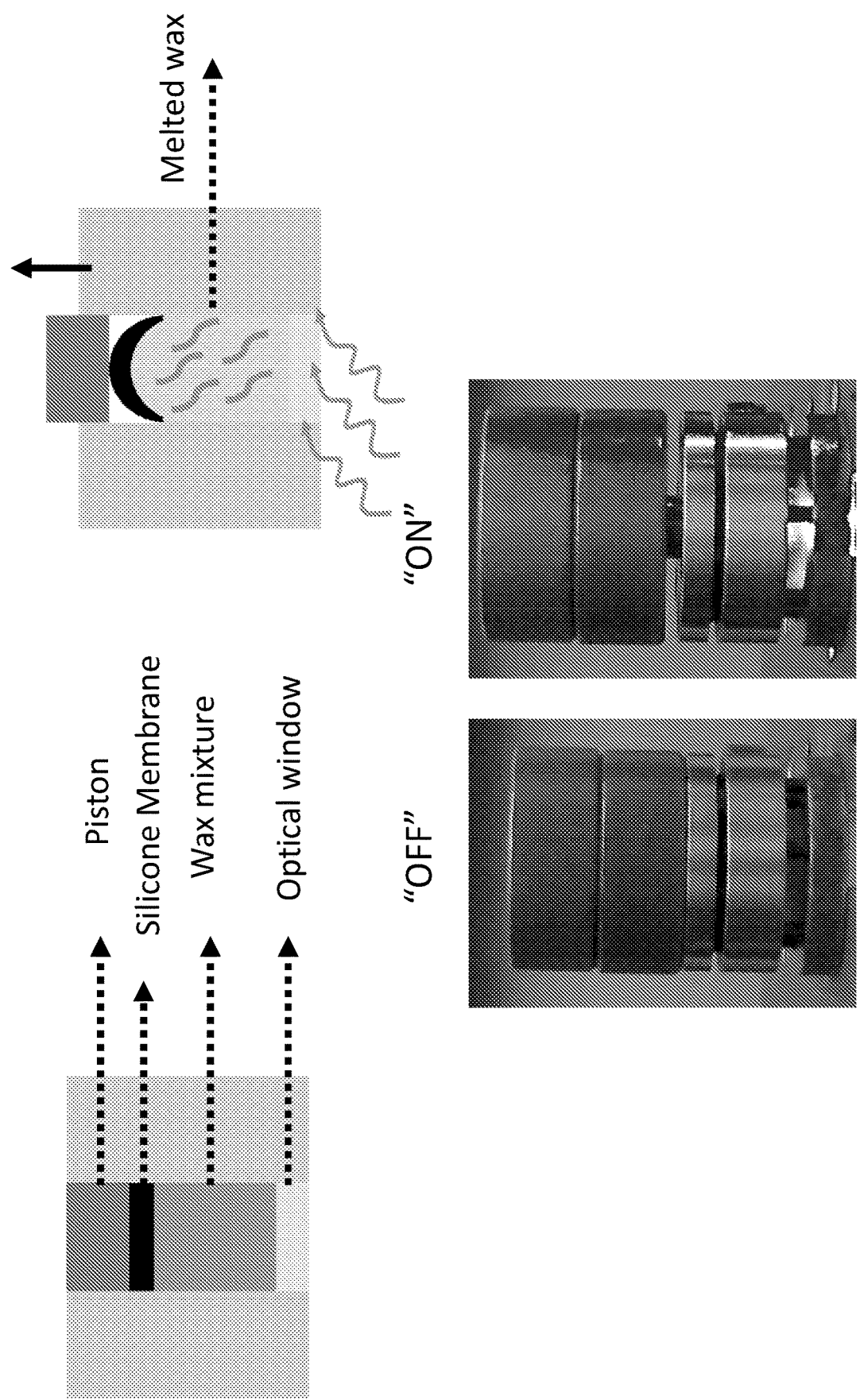
FIG. 16 is a schematic of another apparatus illustrating work output from a silicone membrane instead of a rubber boot in accordance with an embodiment.

FIG. 16 is a schematic of another apparatus illustrating work output from the wax mixture expanding into a silicone membrane in accordance with an embodiment. As shown in FIG. 16, the apparatus can include a piston, a membrane, for example, a silicone membrane, a wax mixture, and optical window. In the "ON" state, the wax melts and expands, causing the silicone membrane to blister upwards and exert a force on the piston.

The detailed description above describes embodiments of a method and system using small molecule absorbers to create a photothermal actuator. The invention is not limited, however, to the precise embodiments and variations described. Various changes, modifications and equivalents may occur to one skilled in the art without departing from the spirit and scope of the invention as defined in the accompanying claims. It is expressly intended that all such changes, modifications and equivalents which fall within the scope of the claims are embraced by the claims.

What is claimed is:

1. A photon-activated substance comprising: a phase change material and a photon activated substance wherein the photon activated substance is at least one of (2,2,6,6-Tetramethylpiperidin-1-yl)oxyl (TEMPO), azobenzene (AZOB), 4-Nitro-4-dimethylaminoazobenzene, Lumogen orange 240, azulene and guaiazulene (GAZ).

2. The photon-activated substance according to claim 1, wherein the phase change material is a wax-based phase change material.

3. The photon-activated substance according to claim 1, wherein the phase change material is an alkane wax-based phase change material.

4. The photon-activated substance according to claim 1, wherein the phase change material is eicosane.

5. The photon-activated substance according to claim 1, wherein the phase change material is eicosane and the at least one of (2,2,6,6-Tetramethylpiperidin-1-yl)oxyl (TEMPO), azobenzene (AZOB), 4-Nitro-4-dimethylaminoazobenzene, Lumogen orange 240, azulene and guaiazulene (GAZ) is guaiazulene (GAZ).

6. The photon-activated substance according to claim 1, further comprising: wherein the at least one of (2,2,6,6-Tetramethylpiperidin-1-yl)oxyl (TEMPO), azobenzene (AZOB), 4-Nitro-4-dimethylaminoazobenzene, Lumogen orange 240, azulene and guaiazulene (GAZ) is guaiazulene (GAZ).

7. The photon-activated substance according to claim 6, wherein the photon-activated substance is activated by a photon source with a laser light having a wavelength of 400 nm to 1000 nm.

8. A wax motor comprising:
   a linear actuator configured to convert thermal energy into mechanical energy;
   a phase change material and
   a photon-activated substance of at least one of (2,2,6,6-Tetramethylpiperidin-1-yl)oxyl (TEMPO), azobenzene (AZOB), 4-Nitro-4-dimethylaminoazobenzene, Lumogen orange 240, azulene and guaiazulene (GAZ) wherein the photon-activated substance is configured to receive photons from a photon source to generate thermal energy that causes the phase change material to change phase such that the thermal energy is converted to the mechanical energy.

9. A method for preparing a photon-activated substance, the method comprising:
   melting a phase change material;
   mixing solid particles from at least one of (2,2,6,6-Tetramethylpiperidin-1-yl)oxyl (TEMPO), azobenzene (AZOB), 4-Nitro-4-dimethylaminoazobenzene, Lumogen orange 240, azulene and guaiazulene (GAZ) with the melted phase change material; and
   forming a mixture of the phase change material and the solid particles from at least one of (2,2,6,6-Tetramethylpiperidin-1-yl)oxyl (TEMPO), azobenzene (AZOB), 4-Nitro-4-dimethylaminoazobenzene, Lumogen orange 240, azulene and guaiazulene (GAZ).

10. The method according to claim 9, further comprising: allowing the mixture of the phase change material and the solid particles from at least one of (2,2,6,6-Tetramethylpiperidin-1-yl)oxyl (TEMPO), azobenzene (AZOB), 4-Nitro-4-dimethylaminoazobenzene, Lumogen orange 240, azulene and guaiazulene (GAZ) to solidify.

11. The method according to claim 9, wherein the phase change material is a wax-based phase change material.

12. The method according to claim 9, wherein the phase change material is an alkane wax-based phase change material.

13. The method according to claim 9, wherein the phase change material is eicosane.

14. The method according to claim 9, wherein the phase change material is eicosane, and the at least one of (2,2,6,6-Tetramethylpiperidin-1-yl)oxyl (TEMPO), azobenzene (AZOB), 4-Nitro-4-dimethylaminoazobenzene, Lumogen orange 240, azulene and guaiazulene (GAZ) is guaiazulene (GAZ).

15. The method according to claim 10, further comprising: melting the solidified mixture of the phase change material and the at least one of (2,2,6,6-Tetramethylpiperidin-1-yl)oxyl (TEMPO), azobenzene (AZOB), 4-Nitro-4-dimethylaminoazobenzene, Lumogen orange 240, azulene and guaiazulene (GAZ) is guaiazulene (GAZ) with a photon source.

16. The method according to claim 15, wherein the photon source can be a lamp or laser light.

17. The method according to claim 9, further comprising: incorporating the phase change material and the at least one of (2,2,6,6-Tetramethylpiperidin-1-yl)oxyl (TEMPO), azobenzene (AZOB), 4-Nitro-4-dimethylaminoazobenzene, Lumogen orange 240, azulene and guaiazulene (GAZ) is guaiazulene (GAZ) into a wax actuator, the wax actuator being a linear actuator configured to convert thermal energy into mechanical energy.

18. A method of converting photons into mechanical energy, the method comprising:
melting a solidified mixture of a phase change material and at least one of (2,2,6,6-Tetramethylpiperidin-1-yl)oxyl (TEMPO), azobenzene (AZOB), 4-Nitro-4-dimethylaminoazobenzene, Lumogen orange 240, azulene and guaiazulene (GAZ) is guaiazulene (GAZ) with a photon source; and
displacing a piston with the melted mixture of the phase change material and at least one of (2,2,6,6-Tetramethylpiperidin-1-yl)oxyl (TEMPO), azobenzene (AZOB), 4-Nitro-4-dimethylaminoazobenzene, Lumogen orange 240, azulene and guaiazulene (GAZ) is guaiazulene (GAZ).

19. The method according to claim 18, further comprising:
resolidifying the melted mixture of the phase change material and the solid particles from at least one of (2,2,6,6-Tetramethylpiperidin-1-yl)oxyl (TEMPO), azobenzene (AZOB), 4-Nitro-4-dimethylaminoazobenzene, Lumogen orange 240, azulene and guaiazulene (GAZ); and repeating the melting and the resolidifying of the phase change material and the solid particles from at least one of (2,2,6,6-Tetramethylpiperidin-1-yl)oxyl (TEMPO), azobenzene (AZOB), 4-Nitro-4-dimethylaminoazobenzene, Lumogen orange 240, azulene and guaiazulene (GAZ).

20. The method according to claim 18, wherein the photon source is a laser or lamp having a wavelength absorbed by a molecular dopant.

* * * * *

UNITED STATES PATENT AND TRADEMARK OFFICE
CERTIFICATE OF CORRECTION

| | | |
|---|---|---|
| PATENT NO. | : 12,398,702 B2 | Page 1 of 1 |
| APPLICATION NO. | : 18/301690 | |
| DATED | : August 26, 2025 | |
| INVENTOR(S) | : Christopher John Bardeen and Brandon F. Lui | |

It is certified that error appears in the above-identified patent and that said Letters Patent is hereby corrected as shown below:

On the Title Page

Item (73) Assignees, should read --THE REGENTS OF THE UNIVERSITY OF CALIFORNIA, Oakland, CA (US)--.

Signed and Sealed this
Seventh Day of October, 2025

John A. Squires
*Director of the United States Patent and Trademark Office*